United States Patent [19]
Schindler et al.

[11] 3,725,411
[45] Apr. 3, 1973

[54] [4-(10,11-DIHYDRODIBENZ[B,F]OXEPIN-10-YL)-1-PIPERAZINYL]-ALKYL]-3-ALKYL-2-IMIDAZOLI-DINONES AS CNS-DEPRESSANTS

[75] Inventors: Walter Schindler, Riehen/Basiland; Erich Schmid, Basle; Armin Zuest, Birsfelden/Basiland, all of Switzerland

[73] Assignee: Ciba-Geigy Corporation, Ardsley, N.Y.

[22] Filed: Aug. 5, 1970

[21] Appl. No.: 61,509

[30] Foreign Application Priority Data

Aug. 11, 1969    Switzerland.....................12124/69

[52] U.S. Cl..............................260/268 TR, 424/250
[51] Int. Cl................................................C07d 51/70
[58] Field of Search......260/268 TR, 243 A, 243 AN

[56] References Cited

UNITED STATES PATENTS

| | | | |
|---|---|---|---|
| 3,563,993 | 2/1971 | Schindler | 260/268 TR |
| 3,646,037 | 2/1972 | Schindler et al. | 260/268 TR |
| 3,646,039 | 2/1972 | Schindler et al. | 260/268 TR |
| 3,379,729 | 4/1968 | Protiva | 260/268 TR |
| 3,320,247 | 5/1967 | Arnold et al. | 260/268 C |
| 3,583,989 | 6/1971 | Fouche et al. | 260/268 TR |

*Primary Examiner*—Donald G. Daus
*Attorney*—Karl F. Jorda and Bruce M. Collins

[57] ABSTRACT

Compounds of the class of 1-[2- or 3-[4-(10,11-dihydrodibenz[b,f]]-alkyl]-3-alkyl-2-imidazolidinone, which can be substituted in 8-position by chloro, methyl or methoxy, and the pharmaceutically acceptable acid addition of salts thereof, have a depressant effect on the central nervous system; pharmaceutical compositions comprising these compounds and a method of producing a depressant effect on the central nervous system of warm-blooded animals are provided.

An illustrative embodiment is 1-[3-[4-(8-chloro-10,11-dihydrodibenz[b,f]oxepin-10-yl)-1-piperazinyl]-propyl]-3-methyl-2-imidazolidinone.

2 Claims, No Drawings

[4-(10,11-DIHYDRODIBENZ[B,F]OXEPIN-10-YL)-1-PIPERAZINYL]-ALKYL]-3-ALKYL-2-IMIDAZOLI-DINONES AS CNS-DEPRESSANTS

DETAILED DISCLOSURE

The present invention relates to imidazolidinone derivatives, to processes for their production, pharmaceutical compositions containing these compounds and the use thereof.

More particularly, the invention relates to compounds of the formula I,

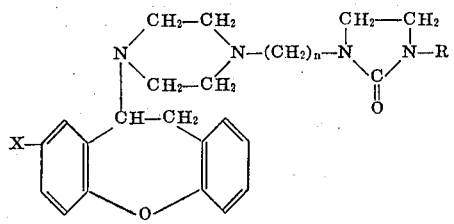

(I)

wherein
X is hydrogen, chloro, methyl or methoxy;
R is alkyl having one to four carbon atoms; and
n is 2 or 3;
and the pharmaceutically acceptable acid addition salts thereof.

It has now been found that such compounds, especially 1-[3-[4-(8-chloro-10,11-dihydrodibenz[b,f]oxepin-10-yl)-1-piperazinyl]-propyl]-3-methyl-2-imidazolidinone, as well as their salts, possess valuable pharmacological properties, and have a high therapeutic index. In the case of oral, rectal or parenteral administration, they have a central depressant action, e.g. they reduce motility, potentiate the effect of anaesthetics, have an anti-emetic action, and have an inhibiting effect in the "test de la traction." Furthermore, they have a sympathicolytic and serotonin-antagonistic action. These properties, which are determined by means of selected standard tests [cp. R. Domenjoz and W. Theobald, Arch.Int.Pharmacodyn. 120, 450 (1959) and W. Theobald et al., Arzneimittelforsch. 17, 561 (1967), characterize the compounds as being suitable for the treatment of states of tension and agitation.

As lower alkyl group in the compounds of formula I, R can be, e.g. the methyl, ethyl, propyl, isopropyl, butyl, isobutyl, sec.butyl, or the tert.butyl group.

A compound of formula I is produced according to the invention by reacting a compound of formula II,

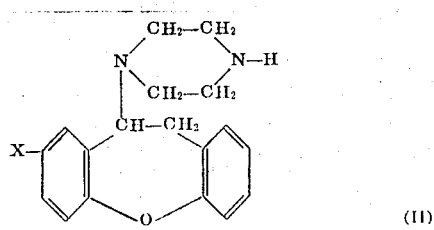

(II)

wherein X has the meaning given under formula I, or an alkali metal derivative of such a compound, with a reactive ester of a compound of formula III,

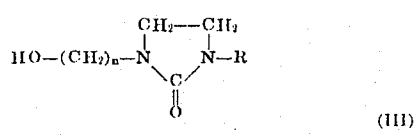

(III)

wherein R and n have the meaning given under formula I; and, optionally, converting the reaction product with an inorganic or organic acid into an addition salt.

Suitable reactive esters of compounds of formula III are, e.g. halides, such as chlorides or bromides, also sulphonic acid esters, e.g. methanesulphonic acid ester, or o- or p-toluenesulphonic acid ester.

These esters are reacted with the free bases II preferably in the presence of a solvent. Suitable solvents are those which are inert under the reaction conditions, e.g. hydrocarbons such as benzene, toluene or xylene; halogenated hydrocarbons such as chloroform; ethereal liquids such as ether or dioxane; as well as lower alkanones such as acetone, methyl ethyl ketone, or diethyl ketone. The reaction temperatures are between ca. 50° and 150°, preferably at the boiling point of the solvent used.

In the reaction according to the invention of one molecular equivalent of reactive ester with one molecular equivalent of free base, one molecular equivalent of acid is split off. This acid can be bound to excess base of formula II, or to the dibasic reaction product. Preferably, however, an acid-binding agent is added to the reaction mixture. Suitable acid-binding agents are, e.g. alkali metal carbonates such as sodium or potassium carbonate, also tertiary organic bases such as, e.g. pyridine, triethylamine or N,N-diisopropylethylamine. Excess tertiary bases may also be used as solvent.

If in the reaction according to the invention is used, instead of the free base of formula II, an alkali metal derivative thereof, e.g. a sodium, potassium or lithium derivative, then it is advantageous for the reaction to be performed in a hydrocarbon, e.g. in benzene or toluene.

The formation of the alkali metal derivatives of the first reactant is preferably performed in situ, e.g. by the addition of at least one molecular equivalent of alkali metal hydride, alkali metal amide, or of an alkali metal organic compound, when to start with one molecular equivalent of free base is used. For example, sodium amide and lithium amide are used as alkali metal amides; sodium hydride as alkali metal hydrides; and phenyl lithium or butyl lithium as alkali metal organic compound.

Of the starting materials of formula II, 8-methyl-10-(1-piperazinyl)-10,11-dihydrodibenz[b,f]oxepin has been described in the literature. 8-Chloro10-(1-piperazinyl)-10,11-dihydrodibenz[b,f]oxepin can be obtained using another process, e.g. as follows: Starting with 8,10-dichloro-10,11-dihydrodibenz[b,f]oxepin, this is condensed in benzene with 1-piperazine-carboxylic acid ethyl ester to 4-(8-chloro-10,11-dihydrodibenz[b,f]10-yl-piperazine-1-carboxylic acid ethyl ester; the condensation product is subsequently hydrolyzed and decarboxylated by heating with potassium hydroxide in ethanol. Further starting materials of formula II can be produced analogously.

The second reactant in the process according to the invention are the reactive esters of compounds of formula III. Of these compounds, for example, 1-(2-chloroethyl)- and 1-(3-chloropropyl)-3-methyl-2-imidazolidinone and 1-(2-chloroethyl)-3-butyl-2-imidazolidinone are known, and may be produced by various processes. Further compounds of this type can be produced analogously.

Using a second process according to the invention, compounds of formula I, of which the symbol $n$ denotes 2, are obtained by reacting a compound of formula II, wherein X has the meaning given under formula I, or an alkali metal derivative of such a compound, with a compound of formula IV,

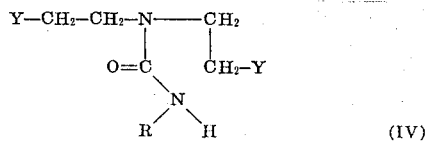

wherein
Y represents halogen,
and R has the meaning given under formula I,
or with an alkali metal derivative of such a compound; and, optionally, converting the reaction product with an inorganic or organic acid into an addition salt.

As halogen, the radical Y of formula IV, is preferably chlorine or bromine.

The reaction according to the invention of the free bases of formula II, or of their alkali metal derivatives, with the urea derivatives, or their alkali metal derivatives, may be performed in the same solvents or diluents, and at the same reaction temperatures, as in the first process. In the reaction of one molecular equivalent of free base with one molecular equivalent of free urea derivative, two molecular equivalents of hydrogen halide are split off, which can also be bound to the same acid-binding agents. Both reactants are used, as alkali metal derivatives, e.g. as sodium, potassium or lithium derivatives, preferably in situ, in the process according to the invention. These alkali metal derivatives can be obtained analogously to the alkali metal derivatives of the first process.

The production of the starting materials of formula II is described following the first process. A starting material which is embraced by formula IV is 1-methyl-3,3-bis-(2-chloroethyl)-urea, which can be obtained, e.g. starting with diethanolamine. With 1-methylisocyanate, the diethanolamine yields 1-methyl-3,3-bis-(2-hydroxy-ethyl)-urea, which reacts with chloride, whereby sulphur dioxide and hydrogen chloride are split off. Further starting materials of formula IV can be produced analogously.

Using a third process according to the invention, a reactive ester of a compound of formula V,

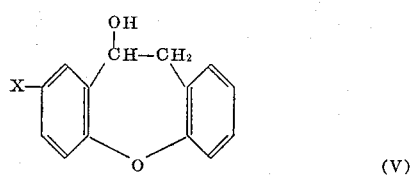

wherein X has the meaning given under formula I, is reacted with a compound of formula VI,

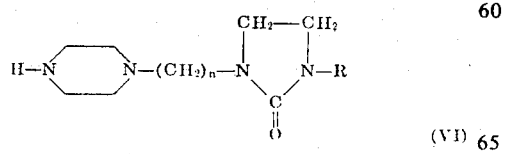

wherein R and $n$ have the meaning given under formula I, or with an alkali metal derivative of such a compound; and, optionally, the obtained reaction product is converted with an inorganic or organic acid into an addition salt.

Suitable reactive esters of compound of formula V are, e.g. halides such as chlorides or bromides, also sulphonic acid esters such as methanesulphonic acid ester, or o- or p-toluenesulphonic acid esters, or o-chloro- or p-chlorobenzenesulphonic acid esters.

The reaction according to the invention of the free bases, or of their alkali metal derivatives, with the reactive esters can be performed in the same solvents or diluents, and at the same reaction temperatures, as in the first process. With the reaction of one molecular equivalent of free base with one molecular equivalent or reactive ester, one molecular equivalent of acid is split off, which can be bound to the same acid-binding agent as in the first process.

Instead of the free bases, it is also possible to use their alkali metal derivatives, e.g. sodium, potassium or lithium derivatives, preferably in situ, in the process according to the invention. These alkali metal derivatives can be obtained analogously to the alkali metal derivatives of the first process.

Starting materials: reactive esters of compounds of formula V, e.g. 10-chloro-10,11-dihydro-dibenz[b,f]oxepin, 8-chloro-, 8-methyl-, or 8-methoxy-10-chloro-10,11-dihydrodibenz[b,f]oxepin, are described in the literature. Further compounds of this type can be produced analogously.

Furthermore, as representative of compounds of formula VI are known, e.g. 1-[2-(1-piperazinyl)-ethyl]-3-methyl-2-imidazolidinone, 1-[3-(1-piperazinyl)-propyl]-3-methyl-2-imidazolidinone, as well as the corresponding 3-ethyl compounds; they can be produced by various methods. Further compounds of this type can be obtained analogously.

The compounds of formula I obtained by the processes according to the invention are, optionally, subsequently converted in the usual manner into their addition salts with inorganic and organic acids. For example, to a solution of a compound of formula I in an organic solvent is added the acid desired as salt component, or a solution of the acid. Preferably chosen for the reaction are organic solvents, in which the formed salt is difficultly soluble, so that it can be separated by filtration. Such solvents are, e.g. methanol, acetone, methyl ethyl ketone, acetone/ethanol, methanol/ether or ethanol ether.

For use as medicaments, it is possible to use, instead of free bases, pharmaceutically acceptable acid addition salts, i.e. salts with such acids of which the anions are not toxic in the case of the dosage amounts in question. It is moreover of advantage if the salts to be used as medicaments crystallize well and are not, or only slightly, hygroscopic. For salt formation with compounds of formula I it is possible to use, e.g. hydrochloric acid, hydrobromic acid, sulphonic acid, phosphoric acid, methanesulphonic acid, ethanesulphonic acid, 2-hydroxyethanesulphonic acid, acetic acid, malic acid, tartaric acid, citric acid, lactic acid, oxalic acid, succinic acid, fumaric acid, maleic acid, benzoic acid, salicylic acid, phenylacetic acid, mandelic acid and embonic acid.

As previously mentioned, the new active substances are administered orally, rectally or parenterally. The dosage depends on the manner of administration, on the species, on the age, and on the individual condition. The daily dosages of the free bases, or of pharmaceutically acceptable salts thereof, vary between 0.15 mg/kg and 10.5 mg/kg for warm-blooded animals. Suitable dosage units such as dragees, tablets, suppositories or ampoules, preferably contain 5–200 mg of an active substance according to the invention.

Dosage units for oral administration contain as active substance preferably between 10–90 percent of a compound of formula I or of a pharmaceutically acceptable salt thereof. They are produced by combining the active substance, e.g. with solid pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants such as magnesium or calcium stearate, or polyethylene glycols, to form tablets or dragee cores. The dragee cores are coated, e.g. with concentrated sugar solutions which may also contain, e.g. gum arabic, talcum and or titanium dioxide; or with a lacquer dissolved in readily volatile organic solvents or mixtures of solvents. Dyestuffs can be added to these coatings, e.g. to distinguish between varying dosages of active substance.

Further dosage units suitable for oral administration are hard gelatine capsules, as well as soft closed capsules made from gelatine and a softener, such as glycerin. The hard capsules preferably contain the active substance as a granulate, e.g. in admixture with fillers such as maize starch, and/or lubricants such as talcum or magnesium stearate, and optionally stabilizers such as sodium metabisulphite ($Na_2S_2O_5$) or ascorbic acid. In soft capsules, the active substance is preferably dissolved or suspended in suitable liquids such as polyethylene glycols, whereby stabilizers may also be added.

Suitable dosage units for rectal administration are, e.g. suppositories consisting of a combination of an active substance with a suppository base material. Suitable suppository base materials are, e.g. natural or synthetic triglycerides, paraffin hydrocarbons, polyethylene glycols, or higher alkanols. Also suitable are gelatine rectal capsules consisting of a combination of the active substance with a base material. Suitable as a base material are, e.g. liquid trigylcerides, polyethylene glycols, or paraffin hydrocarbons.

Ampoules for parenteral administration, especially intramuscular administration, preferably contain a water-soluble salt of an active substance in a concentration of preferably 0.5 – 5 percent, optionally together with suitable stabilizers and buffer substances, in aqueous solution.

The following prescriptions further illustrate the production of tablets, dragees, capsules, suppositories and ampoules:

a. 250 g of 1-[2-[4(8-chloro-10,11-dihydrodibenz[b,f]oxepin-10-yl)-1-piperazinyl]-ethyl]-3-methyl-2-imidazolidinone are mixed with 175.8 g of lactose and 169.70 g of potato starch; the mixture is then moistened with an alcoholic solution of 10 g of stearic acid, and granulated through a sieve. After drying of the granulate, 160 g of potato starch, 200 g of talcum, 2.50 g of magnesium stearate and 32 g of colloidal silicon dioxide are mixed in; the mixture is subsequently pressed into 10,000 tablets each weighing 100 mg and each containing 25 mg of active substance. The tablets can, if required, be provided with grooves for a more precise adjustment of the dosage amount.

b. A granulate is produced from 250 g of 1-[3-[4-(8-chloro-10,11-dihydrodibenz[b,f]oxepin-10-yl)-1-piperazinyl]-propyl]-3-methyl-2-imidazolidinone dihydrochloride, 175.90 g of lactose, and the alcoholic solution of 10 g of stearic acid. After drying of the granulate, it is mixed with 56.60 g of colloidal silicon dioxide, 165 g of talcum, 20 g of potato starch and 2.50 g of magnesium stearate; the mixture is then pressed into 10,000 dragee cores. These are subsequently coated with a concentrated syrup made from 502.28 g of crystallized saccharose, 6 g of shellac, 10 g of gum arabic, 0.22 g of dyestuff and 1.5 g of titanium dioxide; they are then dried. The obtained dragees each weigh 120 mg and each contain 25 mg of active substance.

c. To produce 1000 capsules each containing 25 mg of active substance, 25 g of 1-[2-[3-(8-chloro-10,11-dihydrodibenz[b,f]10-yl)-1-piperazinyl]-propyl]-3-methyl-2-imidazolidinone are mixed with 248.0 g of lactose; the mixture is evenly moistened with an aqueous solution of 2.0 g of gelatine, and then granulated through a suitable sieve (e.g. sieve III, Ph.Helv. V). The granulate is mixed with 10.0 g of dried maize starch and 15.0 g of talcum; the mixture is then evenly filled into 1000 hard gelatine capsules, size 1.

d. A suppository base mixture is prepared from 2.5 g of 1-[3-[4-(8-chloro-10,11-dihydrodibenz[b,f]oxepin-10-yl)-1-piperazinyl]-propyl]-3-methyl-2-imidazolidinone and 167.5 g of adeps solidus; the mixture is then filled into 100 suppositories each containing 25 mg of active substance.

e. A solution of 25 g of 1-[3-[4-(8-chloro-10,11-dihydrodibenz[b,f]10-yl)-1-piperazinyl]-propyl]-3-methyl-2-imidazolidinone dihydrochloride in one liter of water is filled into 1000 ampoules, and then sterilized. An ampoule contains a 2.5 percent solution of 25 mg of active substance.

The following examples further illustrate the production of the new compounds of the general formula I, and of intermediate products not described hitherto; but the examples in no way limit the scope of the invention. The temperatures are given in degrees Centigrade.

EXAMPLE 1 a. 7.6 g (0.024 moles) of 8-chloro-10-(1-piperazinyl)-10,11-dihydrodibenz[b,f]oxepin are dissolved in 100 ml of anhydrous acetone. To this solution are added 7.0 g (0.069 moles) of potassium carbonate; the mixture is heated to boiling, and within one hour is added dropwise a solution of 5.0 g (0.030 moles) of 1-(2-chloroethyl)-3-methyl-2-imidazolidinone in 50 ml of anhydrous acetone. The reaction mixture is further stirred with refluxing for 20 hours, and subsequently cooled and filtered. The precipitate is washed with acetone, and the combined acetone solutions are completely concentrated by evaporation. The oily residue is dissolved in 2-n phosphoric acid, the solution washed with ether, and rendered alkaline with concentrated ammonia. An oil precipitates which is taken up in benzene. The benzene solution is washed with water, dried over sodium sulphate, concentrated by evaporation, and the residue recrystallized from cyclohexane. The obtained 1-[2-[4-(8-chloro-10,11-dihydrodibenz[b,f] oxepin-10-yl)-1-piperazinyl]-ethyl]-3-methyl-2-imidazolidinone melts at 98°–99°.

The starting product: 8-chloro-10-(1-piperazinyl)-10,11-dihydrodibens[b,f]oxepin, is obtained as follows:

b. An amount of 47.5 g (0.300 moles) of 1-piperazine-carboxylic acid ethyl ester is added to a solution of 26.5 g (0.100 mole) of 8,10-dichloro-10,11-dihydrodibenz[b,f]oxepin in 200 ml of benzene. The reaction mixture is refluxed for 15 hours and cooled to 20°; to the reaction mixture are then added 100 ml of 2-n ammonia. The crude free base precipitates. It is extracted three times using each time 150 ml of methylene chloride/ether (1:2). The organic extract is washed with water, dried over magnesium sulphate, and concentrated in vacuo. The residue: 4-(8-chloro-10,11-dihydrodibenz[b,f]oxepin-10-yl)-piperazine-1-carboxylic acid ethyl ester, is used as crude product.

c. The crude product obtained according to b) is introduced into a solution of 61.0 g of powdered potassium hydroxide in 350 ml of abs. ethanol. The obtained cloudy solution is refluxed for 12 hours; to the solution are then added 70 ml of water, the whole is colled and concentrated in vacuo. The residue is taken up in ether/methylene chloride (2:1) and water; the organic phase is separated, washed with water, dried over sodium sulphate, and concentrated by evaporation. The crude base is dissolved in 250 ml of abs. ether and 50 ml of abs. ethanol, and the solution is neutralized with abs. ethereal hydrochloric acid. 8-Chloro-10-(1-piperazinyl)-10,11-dihydrodibenz [b,f]oxepin dihydrochloride precipitates. It is filtered off, then washed with a little acetone, whereupon it melts at 225°–227°.

EXAMPLE 2

26.5 g (0.10 mole) of 8,10-dichloro-10,11-dihydrodibenz[b,f]oxepin, 21 g (0.1 mole) of 1-[2-(1-piperazinyl)-ethyl[-3-methyl-2-imidazolidinone, 7 g (0.05 moles) of potassium carbonate and 0.5 g (0.003 moles) of sodium iodide are refluxed in 130 ml of diethyl ketone for 21 hours. The obtained suspension is concentrated in vacuo, and the residue taken up in ethyl acetate and water. The aqueous phase is separated, and the ethyl acetate extracted with 2-n hydrochloric acid. The acidified extract is adjusted with concentrated ammonia to pH 10, and the liberated base extracted with ethyl acetate. The ethyl acetate solution is dried over sodium sulphate, and concentrated in vacuo. The residue, the crude base, is recrystallized from cyclohexane. The obtained 1-[2-[4-(8-chloro-10,11-dihydrodibenz[b,f]oxepin-10-yl)-1-piperazinyl]-ethyl]-3-methyl-2-imidazolidinone melts at 98°–99°. Yield 10.7 g, 24.3 percent of the theoretical value. The free base is dissolved in methyl ethyl ketone, and converted with abs. ethanolic hydrochloric acid into the dihydrochloride; M.P. of the dihydrochloride: 239°–242°.

EXAMPLE 3 a. 26.5 g (0.10 mole) of 8.10-dichloro-10,11-dihydrodibenz[b,f]oxepin, 12.0 g (0.05 moles) of 1-[3-(1-piperazinyl)-propyl]-3-butyl-2-imidazolidinone, 9 g (0.064 moles) of potassium carbonate, and 0.5 g (0.003 moles) of sodium iodide are refluxed in 100 ml of diethyl ketone for 22 hours. The obtained light-brown suspension is concentrated in vacuo, and the residue is dissolved in water and ethyl acetate. The aqueous phase is separated and the ethyl acetate solution is extracted with 2-n hydrochloric acid. The obtained dihydrochloride is suspended in the acidified phase. It is filtered off and recrystallized from acetonitrile, whereupon the obtained 1-[3-[4-(8-chloro-10,11-dihydrodibenz[b,f]oxepin-10-yl)-1-piperazinyl]-propyl]-3-butyl-2-imidazolidinone dihydrochloride melts at 205°–208°; yield 9.2 g, 35.3 percent of the theoretical value (calculated on the imidazolidinone).

The 1-[3-(1-piperazinyl)-propyl]-3-butyl-2-imidazolidinone required as starting material is produced as follows:

b. An amount of 19.6 g (0.175 moles) of 2-butylaminoethanol is dissolved in 30 ml of abs. methylene chloride. To this solution is added dropwise at -5° to 0°, in the course of 45 minutes, a solution of 20.9 g (0.175 moles) of (3-chloropropyl)-isocyanate in 20 ml of abs. methylene chloride. The reaction mixture is stirred for 2 hours at 30°, and then cooled to 0°. To the cooled solution containing the crude 1-butyl-1-(2-hydroxyethyl)-3-(3-chloropropyl)-urea is added dropwise, in the course of 30 minutes, a solution of 21.9 g (0.182 moles) of thionyl chloride in 20 ml of abs. methylene chloride. The reaction mixture is subsequently refluxed for 4 hours, and concentrated under vacuo. The obtained residue: crude 1-butyl-1-(2-chloroethyl)-3-(3-chloropropyl)-urea, is dried under high vacuum at 70°–80; it is then heated for 3 hours in a bath at 120°, and afterwards for 6 hours in a bath at 140°. The obtained crude 1-(3-chloropropyl)-3-butyl-2-imidazolidinone is distilled in high vacuum, B.P. 110°–112°/0.05 Torr.

c. An amount of 43.7 g (0.2 moles) of 1-(3-chloropropyl)-3-butyl-2-imidazolidinone is dissolved with 35.0 g (0.22 moles) of 1-piperazinecarboxylic acid ethyl ester in 200 ml of diethyl ketone; with the addition of 55.3 g (0.4 moles) of finely powdered potassium carbonate the solution is then refluxed for 24 hours. The reaction mixture is cooled and filtered; the residue is then boiled out twice with 200 ml of chloroform each time, and the chloroform solution filtered. The combined filtrates are concentrated to dryness in vacuo, and the oily residue is distilled under high vacuum. The pure 4-[3-(3-butyl-2-oxo-imidazolidin-1-yl)-propyl[ -piperazine-1-carboxylic acid ethyl ester boils at 195°–197°/0.023 Torr.

d. An amount of 72.2 g (0.212 moles) of the compound obtained according to c) is refluxed with a solution of 112 g (2 moles) of potassium hydroxide in 700 ml of abs. ethanol for 20 hours. The occurring precipitate is filtered off and washed with hot ethanol. The combined filtrates are concentrated by evaporation to dryness. The residue is taken up in 300 ml of benzene and 100 ml of water; after separation with potassium carbonate, the aqueous phase is saturated and extracted four times with benzene. The combined benzene solutions are dried over potassium carbonate, and separated in vacuo from the solvent. The residue is distilled in high vacuum, whereby the pure 1-[3-(1-piperazinyl)-propyl[-3-butyl-2-imidazolidinone passes over at 163°–167°/0.035 Torr; $n_D^{24°}$ : 1.522.

EXAMPLE 4

Analogously to Example 3 is obtained, from 55 g (0.21 moles) of 8.10-dichloro-10,11-dihydrodibenz[b,f]oxepin, 26 g (0.12 moles) of 1-[3-(1-piperazinyl)-propyl[-3-methyl-2-imidazolidinone, 18 g (0.128 moles) of potassium carbonate, and 1.0 g (0.006 moles) of sodium iodide, 1-[3-[4-(8-chloro-10,11-dihydrodibenz[b,f]10-yl)-1-piperazinyl]-propyl]-3-methyl-2-imidazolidinone, which is converted into the dihydrochloride, M.P. 230°–231.5°; yield 20.5 g, 18.5 percent of the theoretical value.

EXAMPLE 5 a. An amount of 31.5 g (0.010 mole) of 8-chloro-10-(1-piperazinyl)-10,11-dihydrodibenz[b,f]oxepin is refluxed with 2.80 g (0.014 moles) of crude 1-methyl-3,3-bis-(2chloroethyl)-urea and 3.6 g (0.026 moles) of anhydrous potassium carbonate in 36 ml of diethyl ketone for 12 hours. A further 2.4 g (0.018 moles) of potassium carbonate are added after 4 hours reaction time, and the same amount is again added after 8 hours reaction time. The reaction mixture is cooled, diluted with ether, filtered, and the filtrate concentrated in vacuo. The residue (5.5 g) is taken up in ether, the solution extracted with 1-n hydrochloric acid, the acidified extract washed with ether, and excess sodium carbonate added. The precipitated free base is taken up in ether; the ether solution is then washed with water, dried over sodium sulphate, and concentrated by evaporation. The residue is chromatographed on a column of silica gel (Merck, grain-size 0.05–0.2 mm) which has been impregnated with 0.5-n sodium hydroxide solutions. Chloroform is used as the eluent. The fractions, containing the crude product, are concentrated by evaporation. The residue is recrystallized from cyclohexane, whereupon the pure 1-[2-[4-(8-chloro-10,11-dihydrodibenz[b,f]oxepin-10-yl)-1-piperazinyl]-ethyl]-3-methyl-2-imidazolidinone, M.P. 98°–99, is obtained; yield 2.64 g, 60 percent of the theoretical value.

The required crude 1-methyl-3,3-bis-(2-chloroethyl)-urea is obtained as follows:

b. An amount of 105.1 g (1.0 mole) of freshly distilled diethanolamine is dissolved in 1000 ml of abs. methylene chloride. To this solution are added at 10°, in the course of one hour, 59.0 g (1.03 moles) of methylisocyanate dissolved in 200 ml of abs. methylene chloride. The reaction mixture is refluxed for 150 minutes, and then cooled to 0°; to the obtained solution of 1-methyl-3,3-bis-(2-hydroxyethyl)-urea is then added dropwise, in the course of 1 hour, a solution of 250 g (2.1 moles) of thionyl chloride in 250 ml of abs. methylene chloride. The reaction mixture is then refluxed for 4 hours, and concentrated in vacuo; the residue: crude 1-methyl-3,3-bis-(2-chloroethyl)-urea, is afterwards dried for 8 hours at 70°–80° under high vacuum.

EXAMPLE 6

Analogously to example 1a is obtained from 7,6 g (0,024 moles) of 8-chloro-10-(1-piperazinyl)-10,11-dihydro-dibenz[b,f]oxepin, 7,6 g (0,069 moles) of potassium carbonate and 5,3 g (0,030 moles) of 1-(3-chloropropyl)-3-methyl-2-imidazolidinone the compound 1-[3-[4(8-chloro-10,11-dihydro-dibenz[b,f]oxepin-10-yl)-1-piperazinyl]-propyl]-3-methyl-2-imidazolidinone, which is converted according to example 2 into the dihydrochloride. M.P. 230°–231,5°.

EXAMPLE 7

Analogously to example 2 is obtained:

a. from 26,1 g (0,10 moles) of 8-methoxy-10-chloro-10,11-dihydro-dibenz[b,f]oxepin, 21,2 g (0,10 moles) of 1-[2-(1-piperazinyl)-ethyl]-3-methyl-2-imidazoloinone, 7,0 g (0,05 moles) of potassium carbonate and 0,5 g (0,003 moles) of sodium iodide the compound 1-[2-[4-(8-methoxy-10,11-dihydrodibenz[b,f]10-yl)-1-piperazinyl]-ethyl-3-methyl-2-imidazolidinone-dihydrochloride.

b. from 16,1 g (0.07 moles) of 10-chloro-10,11-dihydro-dibenz[b,f]oxepin, 16,0 g (0,07 moles) of 1-[2-(1-piperazinyl)-ethyl]-3-ethyl-2-imidazolidinone, 2,5 g of potassium carbonate and 0,5 g of sodium iodide the compound 1-[2-[4-(10,11-dihydro-dibenz[b,f]oxepin-10-yl)-1-piperazinyl]-ethyl]-3-ethyl-2-imidazolidinone-dihydrochloride. M.P. 225°–228°; free base: M.P. 98°–100°.

c. from 12,2 g (0,05 moles) of 8-methyl-10-chloro-10,11-dihydro-dibenz[b,f]oxepin, 12,0 g (0,05 moles) of 1-[2-(1-piperazinyl)-ethyl]-3-isopropyl-2-imidazolidinone, 7,0 g of potassium carbonate and 0,3 g of sodium iodide the compound 1-[2-[4-(8-methyl-10,11-dihydro-dibenz[b,f]oxepin-10-yl)-1-piperazinyl]-ethyl]-3-isopropyl-2-imidazolidinone-dihydrochloride. M.P. 198°–203°.

The required 8-methyl-10-chloro-10,11-dihydro-dibenz[b,f]-oxepin is obtained as follows:

d. 20,0 g (0,0893 moles) of 8-methyl-dibenz[b,f]oxepin-10,11H-on are dissolved in 160 ml of absolute tetrahydrofurane and this solution is then added in the course of 30 minutes to a solution of 4,0 g of lithiumaluminiumhydride in 80 ml of absolute tetrahydrofurane. The reaction mixture is then refluxed for 3 hours followed by decomposition by adding of water, then of 15 percent sodium hydroxide solution and finally of water, whereby hydrogen gas is developed. After working up 26,0 g of a nearly colorless viscous oil are obtained which represents the 8-methyl-10,11-dihydro-dibenz[b,f]oxepin-10-ol which is used in crude state for the subsequent reaction.

e. 20,6 g (ca. 0,09 moles) of the compound obtained according to d) are dissolved in 170 ml of absolute benzene and the 28 ml of pyridine are added. To this solution then a solution of 16,0g (0,134 moles) of thionylchloride in 70 ml of absolute benzene is added in the course of 45 minutes and the reaction mixture is kept at 45° for 4 hours. The pale-yellow solution is then decanted from deposited pyridine-hydrochloride, washed with water and then two times with 2-n hydrochloric acid, dried over magnesium sulphate and concentrated, whereby a pale-yellow oil is obtained which slowly crystallizes representing 8-methyl-10,11-dihydro-10- chloro-dibenz[b,f]oxepin. Yield: 19,0 g; M.P. 48°–52°–54,5°.

What is claimed is:

1. A compound of the formula I,

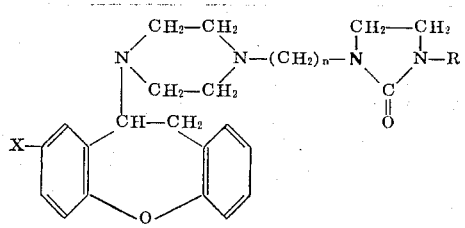

(I)

wherein
X is hydrogen, chloro, methyl or methoxy;
R is alkyl having one to four carbon atoms; and
n is 2 or 3;
and the pharmaceutically acceptable acid addition salts thereof.

2. A compound according to claim 1, which is 1-[3-[4-(8-chloro-10,11-dihydrodibenz[b,f]oxepin-10-yl)-1-piperazinyl]-propyl]-3-methyl-2-imidazolidinone and a pharmaceutically acceptable acid addition salt thereof.

* * * * *